(12) United States Patent
Morin et al.

(10) Patent No.: US 8,703,832 B2
(45) Date of Patent: Apr. 22, 2014

(54) INTERPENETRATING POLYMER NETWORKS AND USES THEREOF

(75) Inventors: Arnaud Morin, Grenoble (FR); Bruno Ameduri, Montpellier (FR); Linda Chikh, Naisons-Laffitte (FR); Odile Fichet, Poissy (FR); Gérard Gebel, Saint Egreve (FR); Régis Mercier, Irigny (FR)

(73) Assignees: Commissariat a l'energie Atomique et aux Energies Alternatives, Paris (FR); Centre National de la Recherche Scientifique, Paris (FR); Universite de Cergy-Pontoise, Cergy-Pontoise Cedex (FR); Ecole Nationale Superieure de Chimie de Montpellier, Montpellier Cedex (FR); Universite de Savoie, Chambery (FR)

( * ) Notice: Subject to any disclaimer, the term of this patent is extended or adjusted under 35 U.S.C. 154(b) by 249 days.

(21) Appl. No.: 13/133,725

(22) PCT Filed: Dec. 8, 2009

(86) PCT No.: PCT/FR2009/001401
§ 371 (c)(1),
(2), (4) Date: Jul. 18, 2011

(87) PCT Pub. No.: WO2010/066964
PCT Pub. Date: Jun. 17, 2010

(65) Prior Publication Data
US 2012/0172462 A1    Jul. 5, 2012

(30) Foreign Application Priority Data
Dec. 9, 2008    (FR) ...................................... 08 06890

(51) Int. Cl.
*B01J 39/20*    (2006.01)
*H01M 8/10*    (2006.01)

(52) U.S. Cl.
USPC .................................. 521/27; 521/38; 429/34

(58) Field of Classification Search
USPC ......................................... 521/27, 38; 429/34
See application file for complete search history.

(56) References Cited

U.S. PATENT DOCUMENTS

| | | | |
|---|---|---|---|
| 6,444,343 B1 * | 9/2002 | Prakash et al. ................. | 429/493 |
| 7,176,247 B1 * | 2/2007 | Walker, Jr. ..................... | 521/140 |
| 2003/0138490 A1 * | 7/2003 | Hu et al. ........................ | 424/486 |
| 2005/0112434 A1 * | 5/2005 | Park et al. ....................... | 429/30 |

FOREIGN PATENT DOCUMENTS

WO    WO 98/22989 A1    5/1998

OTHER PUBLICATIONS

Cui et al. "Preparation and characterization of emulsifier-free core-shell interpenetrating polymer network-fluorinated polyacrylate latex particles", Colloids and Surfaces, A: Physicochemical and Engineering Aspects (2008), 324(1-3), 14-21, CODEN: CPEAEH; ISSN: 0927-7757.*
International Search Report for International Application No. PCT/FR2009/001401 dated Feb. 17, 2010.
Written Opinion for International Application No. PCT/FR2009/001401 (undated).
Yamaguchi, T. et al., *Pore-Filling Type Polymer Electrolyte Membranes for a Direct Methanol Fuel Cell*, Journal of Membrane Science, 214, (2003), pp. 283-292.

* cited by examiner

*Primary Examiner* — Michael Bernshteyn
(74) *Attorney, Agent, or Firm* — Alston & Bird LLP

(57) ABSTRACT

Interpenetrating polymer networks comprising a first network of polymer A formed from monomers, at least one of which contains an aromatic group functionalized with a cation-exchange group, and a second network of polymer B formed from monomers, at least one of which contains a fluorinated group ($R_F$). Use of these interpenetrating polymer networks for manufacturing fuel cell membranes.

14 Claims, 1 Drawing Sheet

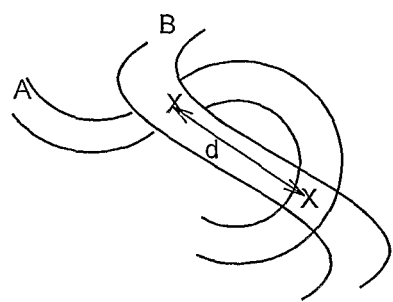

INTERPENETRATING POLYMER NETWORKS AND USES THEREOF

FIELD OF THE INVENTION

The invention relates to novel interpenetrating polymer networks, to a process for manufacturing them and to their use, especially for manufacturing fuel cell membranes.

BACKGROUND OF THE INVENTION

Fuel cells find many applications as substitutes for standard batteries in many electrical devices. The cores of fuel cells of PEMFC type (Proton Exchange Membrane Fuel Cell) and DMFC type (Direct Methanol Fuel Cell), also known as MEAs (Membrane/Electrode Assemblies), are formed from a polymer electrolyte membrane and two electrodes (anode and cathode) placed on each face of this membrane.

MEAs enable conversion of the chemical energy of a reaction into electrical energy, for example that of formation of water from hydrogen ($H_2$) for PEMFC or of methanol for DMFC and oxygen gas ($O_2$).

The membrane of PEMFC and DMFC fuel cells must satisfy 3 functions:
  conduction of the ionic species and more specifically of protons,
  separation of the anode and cathode reagents,
  electronic insulation.

In order to ensure all these functions, the membrane must be a good proton conductor, with a conductivity of between $5 \times 10^{-2}$ and $10^{-1}$ S/cm under the operating conditions. It must be sparingly permeable to reagents ($H_2$ and $O_2$ in the case of PEMFC or methanol and $O_2$ in the case of DMFC), and must preferably have a permeability of less than $10^{-14}$ mol/(m·s·Pa) for each of the reagents under the operating conditions. Finally, it should be a good electronic insulator.

Moreover, the membrane must be stable (chemically, physically) under the operating conditions of the fuel cell. The criteria that influence the stability of the materials are temperature, the amount of water, the activity of the reagents (especially $H_2$, or $O_2$ in the case of PEMFC), the electrical potential (V) and the pH. The most extreme conditions that may be observed in a fuel cell of PEMFC type are:
  pH from 0 to 1,
  temperature: 120° C.,
  100% relative humidity,
  anode: $PH_2$=4 bar, $V_a$=0 V,
  cathode: $PO_2$=4 bar, $V_c$=1.2 V.

Finally, this material must be inexpensive, nontoxic and easy to handle.

At the present time, the most advanced proton exchange membrane fuel cells (PEMFCs), whether they are commercially available or incorporated into demonstrators, are made with perfluorosulfone polymer electrolytes of Nafion® or Hyflon® type. Specifically, this type of polymer simultaneously has the best performance qualities and the longest lifetime. However, the performance qualities achieved with these membranes are still insufficient, irrespective of their uses (portable, stationary, transport).

Application in the field of transport is the most constraining from the point of view of the specifications (cost, working temperature, performance, lifetime). Ideally, for an application in motor vehicles, it would be necessary to have available a PEMFC that operates between −20° C. and 120° C. in sparingly humidified gases (between 0 and 50% relative humidity) and with a lifetime of at least 5000 hours with 10 000 start/stop cycles. However, as a result of their chemical and physical structure, perfluorosulfone membranes do not have the required properties to be used under these conditions. Specifically, their working temperature is limited to 80° C. Beyond this temperature, the mechanical properties of these membranes break down and, in sparingly humidified gases, their proton conductivity decreases. Moreover, even at 80° C., their lifetime does not at the present time exceed 2000 hours, on account of chemical attack that these membranes undergo by the free radicals generated by the cell, but above all on account of the mechanical fatigue generated by the successions of swelling/deswelling during the start/stop cycles. Finally, as a result of their method of synthesis and of their chemical composition, their manufacture remains too expensive for this application.

Thus, PEMFC electrolytes have been the subject of intense research worldwide for several years, in the aim of reducing their cost and/or of increasing their lifetime or their performance or their working temperature. However, it proves difficult, or even impossible, to simultaneously achieve all these objectives with the research approaches currently adopted, which are based on various improvements of the existing polymer electrolytes by physical modifications (addition of inorganic compounds, mixtures of polymers, etc.) or chemical modifications (modification of the chemical structure of the polymer to increase the glass transition temperature).

Hydrocarbon-based polymer membranes have a lifetime in a fuel cell that is more limited than perfluorosulfone membranes. The reason for this is that they are much more sensitive to chemical degradation by radical attack and have poor mechanical properties, especially on account of excessive swelling. Specifically, to have a proton conductivity similar to that of perfluorosulfone membranes, they must have a high ion-exchange capacity (IEC), which induces large swelling in the presence of water and great fragility in the dry state.

Composite or hybrid membranes based on perfluorosulfone polymers do not solve the problem of the cost of the electrolyte.

Composite or hybrid membranes based on nonconductive polymers (PBI, PVDF, etc.) doped with organic compounds (ionic liquids, etc.) or proton-conducting inorganic compounds (phosphoric acid, heteropolyacids, etc.) have elution problems and/or are limited to operating temperatures above 100° C. Moreover, it is difficult to make suitable active layers due to lack of a proton-conducting binder of the same nature as that of the membrane.

The current situation is thus that no membrane satisfies the working conditions for motor vehicle application.

The invention more particularly relates to the preparation of a membrane formed from a first network of cationic-conducting polymer (crosslinked cationic-conducting polymer referred to hereinbelow as A) and from a second network of fluorocarbon polymer (crosslinked and referred to hereinbelow as B). Since these two networks are not linked together via covalent bonds, they are referred to as interpenetrating polymer networks (IPNs).

Interpenetrating polymer networks (IPNs) have been known for a long time, and some have been described for their use in the manufacture of fuel cell membranes.

International application WO 2005/003 237 describes IPNs based on silicones and mentions the application as membrane for a fuel cell. The IPN therein is formed from a silicone-based network that may be fluorinated. The IPN is made by impregnation, using a solvent or via a supercritical route, of precursor monomers of the second network in the crosslinked or noncrosslinked silicone. The monomers are then polymerized/crosslinked to make the second network. Thus, the production of the polymer (noncrosslinked) or network (crosslinked) A takes place once the first polymer (non-crosslinked) or network (crosslinked) is formed.

However, silicones have the drawback of not being stable under the operating conditions of fuel cells. In addition, the formation of the two networks successively presents drawbacks: specifically, it is difficult to be able to impregnate the network already formed with monomers of the second network. It is possible to do so via the supercritical route, as is envisaged in said document, but this synthetic route is burdensome to implement. In addition, only a simultaneous formation of the two networks makes it possible to obtain nanometric distribution of the two phases in the case of the polymers of the invention.

Document U.S. Pat. No. 7,176,247 describes an IPN intended for DMFC use, this IPN being formed from a first proton-conducting network of sulfonated or phosphonated AMPS (2-acrylamido-2-methylpropanesulfonic acid) copolymer and from a second network of PVA (polyvinyl alcohol). These two networks are not stable under the working conditions of the fuel cell. The two networks are not synthesized simultaneously via an in situ synthesis. Finally, the synthesis described in this prior art takes place in a mixture of water and alcohol and cannot be transposed to make the IPNs that are the subject of the present invention.

Document WO 98/22989 describes fuel cell membranes composed of polystyrenesulfonic acid and of poly(vinylidene fluoride). They are prepared via a process according to which an inert PVDF matrix is first prepared and this matrix is then impregnated with the mixture of styrene and DVB. Polymerization of the styrene/DVB network allows its interpenetration with the PVDF matrix. It is followed by a sulfonation step. However, PVDF is not crosslinkable, and so the PVDF matrix does not constitute a "polymer network" within the sense of the invention. The process taught by WO 98/22989 affords access only to a semi-IPN (network interpenetrated with a polymer).

The document from T. Yamaguchi et al., Journal of Membrane Science, 214, 2003, 283-292 describes a method for preparing cation-exchange IPN membranes. Network A is created in a crosslinked porous membrane (network B). In this prior art, the porous membrane formed from a polyethylene network (CLPE) is impregnated with poly(tert-butylacrylamidesulfonic acid) (PATBS), which is then crosslinked. It is possible to replace CLPE with a crosslinked or noncrosslinked fluorinated polymer, and the PATBS with a cation-exchange ionomer containing aromatic groups. However, the method for producing the two networks described in this prior art is not simultaneous and is not performed in situ. Furthermore, the physical structure of the IPN obtained with the method described in this prior art is not at the scale of a few nanometers.

Specifically, it is known how to characterize the distance between two IPNs by measuring the minimum distance between two successive nodes. A node may be defined as the place where two networks cross (cf. FIG. 1, which illustrates two networks A and B crossing at two successive nodes labeled X separated by a distance d). This distance may be measured via various methods that are well known to those skilled in the art, such as:

small-angle neutron or X-ray scattering,
transmission electron microscopy (TEM),
atomic force microscopy (AFM).

And, in the prior art, this distance is greater than 50 nm.

In T. Yamaguchi et al., the morphology of the material is imposed by that of the network B. Moreover, the method described in this prior art only makes it possible to obtain a material in the form of a membrane, in contrast with the method of the invention. Finally, this process, if it were applied to the polymers used in the invention, would have major implementation difficulties: specifically, it is difficult to impregnate a highly hydrophobic fluorinated porous membrane with hydrophilic precursor monomers. This requires several steps and often leaves residual porosity.

SUMMARY OF THE INVENTION

A first subject of the invention is an interpenetrating polymer network, comprising:
a first network of polymer A formed from monomers, at least one of which contains at least one aromatic group functionalized with at least one cation-exchange group,
a second network of polymer B formed from monomers, at least one of which contains at least one fluorinated group ($R_F$).

The term "polymer network" means a three-dimensional polymeric structure resulting from the copolymerization of at least two monomers.

BRIEF DESCRIPTION OF THE DRAWINGS

FIG. 1 illustrates two networks A and B crossing at successive nodes.

DETAILED DESCRIPTION OF THE INVENTION

Advantageously, network A results from the copolymerization of at least two monomers, one of which comprises at least one aromatic group and at least one cation-exchange group, for instance an imidazolium group, or an acid group, such as a carboxylic acid (COOH), a phosphonic acid ($PO_3H$) or a sulfonic acid ($SO_3H$). The monomers used to construct network A may contain fluorinated groups (F).

Formation of Network A

Network A may be constructed using:

1/ a first monomer with at least one aromatic ring and two polymerizable functions PF1 and on at least one of the aromatic rings at least one cation-exchange group of the type such as imidazolium or carboxylic acid (COOY), phosphonic acid ($PO_3Y$) or, preferably, sulfonic acid ($SO_3Y$) where Y is chosen from H, Li, Na, K and $HNR_3$ where R represents an alkyl group comprising 1 to 5 carbon atoms.

2/ a second monomer comprising at least two polymerizable functions PF2 susceptible to react with the functions PF1 of the first monomer to form a covalent bond.

The functions PF1 and PF2 may be identical or different.

The network may be constructed from additional monomers comprising polymerizable functions PF1 or PF2, these additional monomers modulating the properties of the first and second monomers.

Network A may have as general chemical structure that of polyarylenes or polyarylene ethers or polyarylene sulfites, which may or may not be fluorinated, of polysulfone, polysulfite sulfone, polyimide, polyquinoxaline, polyquinoline, polyparaphenylene, polybenzimidazole, polyether ketone, polyether sulfone or polyetherimide type, functionalized with cation-exchange groups of imidazolium or carboxylic acid (COOH) or phosphonic acid ($PO_3H$) or sulfonic acid ($SO_3H$) type.

The crosslinking agent is defined as the compound of highest functionality. The content of crosslinking agent for a given network is the number of moles of molecule having the highest functionality relative to the number of moles of precursors serving to form the network.

Network A gives the material its cation-exchange properties. The content of crosslinking agent in network A is between 0.1% and 100% and preferably between 25% and 50%. The ion-exchange capacity of network A is greater than 0.5 mmol/g and preferably greater than 1 mmol/g.

More precisely, when network A is constructed from fluorovinyl ether precursors, a content of crosslinking agent of between 30% and 50% is preferentially chosen. Furthermore, when network A is constructed from sulfonated diamine precursors, a content of crosslinking agent of between 25% and 50% is preferentially chosen.

Network B results from the copolymerization of at least two monomers, one of which comprises at least one fluorinated group. Advantageously, it contains groups $CF_n$ with n=1, 2 or 3. It may be envisaged for at least one of the monomers of network B to contain aromatic groups.

Formation of Network B

Network B may be constructed using:
1/ a first monomer comprising groups $CF_n$ with n=1 to 3 comprising at least two polymerizable functions PF3,
2/ a second monomer comprising at least two polymerizable functions PF4, which are susceptible to react with the functions PF3 of the first monomer to form a covalent bond.

The functions PF3 and PF4 may be identical or different.

The network may be constructed from additional monomers comprising polymerizable functions PF3 or PF4, these additional monomers modulating the properties of the first and second monomers.

The polymerizable functions PF1 and PF2 are chosen to react together according to a mechanism different than that chosen for PF3 and PF4, so as to avoid copolymerization of the two networks.

Network B may have as general chemical structure that of fluorocarbon polymers of the type such as polytetrafluoroethylene, polyvinylidene fluoride, polychlorotrifluoroethylene, poly(ethylene-alt-chloro-trifluoroethylene) copolymers, poly(tetrafluoro-ethylene-co-hexafluoropropene) or FEP, poly(ethylene-alt-tetrafluoroethylene) copolymers or fluorinated polyarylenes.

This network makes it possible to adjust the mechanical properties of the membranes and to improve the chemical stability of the ionomer toward hydrolysis and oxidation. The content of crosslinking agent in network B is between 0.1% and 100% and preferentially between 1% and 100%.

More precisely, when network B is constructed from diepoxide precursors, a content of crosslinking agent of between 25% and 50% is preferentially chosen. And, when network B is constructed from monoacrylate or monomethacrylate precursors, a content of crosslinking agent of between 1% and 99% is preferentially chosen, and, in this case, the crosslinking agent is chosen from monomers comprising at least two acrylate or methacrylate functions. And, when network B is constructed from diacrylate or dimethacrylate precursors, the monomer is crosslinking, and there is 100% crosslinking agent.

Advantageously, the weight proportion of network A in the IPN of the invention is between 50% and 80% relative to the two networks A and B as a whole.

Certain monomers of network A bear one or more aromatic groups containing at least one cation-exchange function, for example of imidazolium or acid type. Network A thus gives the material its cation-exchange properties and network B adjusts its mechanical properties and improves the resistance of network A to chemical and electrochemical degradation, such as hydrolysis or oxidation. This membrane is more especially intended for PEMFC application when network A is proton-conducting.

The development of IPN represents the only possible method for combining crosslinked polymers, i.e. the only route for producing a polymer blend that is stable over time and that does not lead to an anisotropic material. This particular feature is associated with the very method of synthesis of the material:

Simultaneous in situ synthesis: starting with a homogeneous mixture of the precursors of networks A and B (functionalized monomers and/or polymers), a three-dimensional network of a polymer is constructed within another network, which is itself also three-dimensional, by simultaneous polymerization and/or crosslinking of the two networks.

When it is impossible to obtain a homogeneous mixture of all the precursors, it may be necessary to resort to the use of a solvent. In addition, it is necessary to use different polymerization and/or crosslinking methods to make the two partner networks A and B, in order to avoid the formation of a copolymer network or co-network.

During this synthesis, the two polymer networks are interwoven but remain independent, i.e. with no covalent bonding between them since the two crosslinking reactions are different. The morphology of IPNs is generally described as that of two phases that are co-continuous over the whole material, the size of the domains of which depends on the degree of interpenetration of the two networks. And, in the IPNs of the invention, the local distance between two successive nodes may be as low as 10 nm or less. This architecture generally has, without this yet being clearly explained, increased resistance to both chemical and physical attack when compared with the corresponding simple homopolymer networks.

The strategy of simultaneous in situ preparation is the simplest, theoretically, to perform, since it consists in initiating the polymerization and/or crosslinking reactions at the same time starting from a homogeneous mixture of all the reagents, which does not imply, of course, that the reactions for formation of the two networks proceed at the same speed. However, according to one variant of this strategy, it may be envisaged, for example, to delay the initiation of the reaction having the fastest kinetics in order to optimize the interpenetration of the two networks. One of the characteristics of the simultaneous in situ preparation method is that neither of the two networks is totally constructed before the construction of the other has started.

A necessary condition for obtaining IPNs is that the polymerization reactions leading to the formation of networks A and B must be different in order for the two networks not to crosslink with each other.

A subject of the invention is thus also a process for manufacturing an interpenetrating polymer network comprising a network A and a network B as described above, this process comprising:
(i) at least one step during which the precursor monomers of network A and the precursor monomers of network B are mixed together,
(ii) at least one step during which the polymerization of A and the polymerization of B are initiated.

Since the monomers have been chosen so as to form crosslinked polymer networks, the two polymer networks are constructed simultaneously, independently, i.e. without formation of covalent bonds between the two networks, and interwoven into each other.

Deposition of the mixture in a mold so as to give the IPN network the desired shape and dimensions depending on the use that must be made thereof may be envisaged between steps (i) and (ii). For example, this step may consist of deposition on a plate, such as a glass plate, using a tool for obtaining a substantially flat deposit, so as to obtain a membrane.

Depending on the choice of monomers, either they may be mixed together directly, or a solvent may be used to mix them. In the case where a solvent is used, it is removed after formation of the IPN via methods known to those skilled in the art.

Compared with the networks of the prior art, the IPNs of the invention have the following advantage: a distance between the polymer networks A and B of less than or equal to 40 nm, advantageously less than 20 nm and even more preferentially less than 10 nm. This distance may be measured by one of the following methods:

small-angle neutron or X-ray scattering, transmission electron microscopy (TEM), atomic force microscopy (AFM).

Protocols for implementing these methods are described in: B. Kim et al., Journal of Membrane Science 250 (2005) 175-182; N. Takimoto et al., Journal of Power Sources 194 (2009) 662-667; D. Loveday et al., Macromolecules, 28 (1995) 7822-7830.

And, when it is stated that the distance between the polymer networks A and B is less than or equal to 40 nm, this means that via one of the analysis methods mentioned above, the results of which are substantially identical, at least two successive nodes separated by not more than 40 nm may be found in the IPN.

Formation of network A: By way of example, combinations of monomers for constructing network A are described below:

Formation of Network A by Dimerization of Fluorovinyl Ether Functions:

Network A may be prepared by dimerization of fluorovinyl ether functions with:

1/ a first monomer comprising at least one aromatic ring and two functions —O—CF=CF$_2$, and, on at least one of the aromatic rings, at least one cation-exchange group of imidazolium or carboxylic acid (COOY) or phosphonic acid (PO$_3$Y) or, preferably, sulfonic acid (SO$_3$Y) type, where Y is chosen from H, Li, Na, K and HNR$_3$ where R represents an alkyl group comprising from 1 to 5 carbon atoms, 2/ a second monomer comprising three functions —O—CF=CF$_2$, 3/ optionally one or more other monomers comprising at least two functions —O—CF=CF$_2$.

The presence of the third monomer in the synthesis is not essential. It is used to adjust the ion-exchange capacity of the membrane. The first and second monomer may be used alone.

Examples of First Monomers:

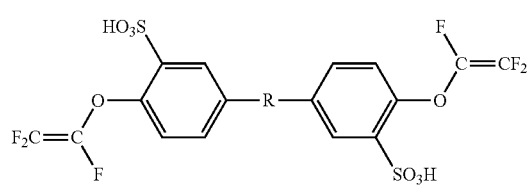

R represents SO$_2$, CH$_2$,

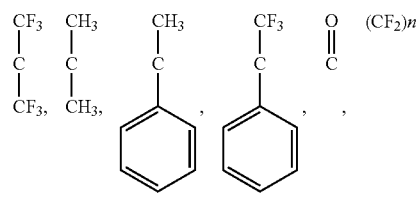

and $4 \leq n \leq 12$.

Examples of Second Monomers:

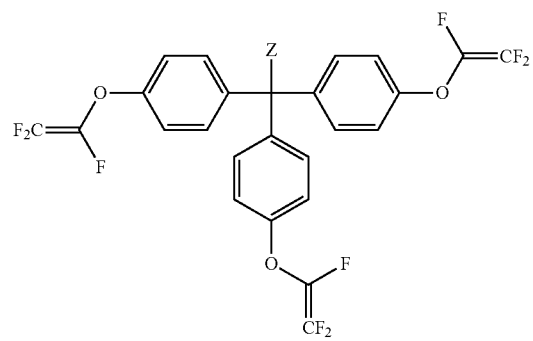

Z represents CH$_3$, CF$_3$, H

Examples of Third Monomers:

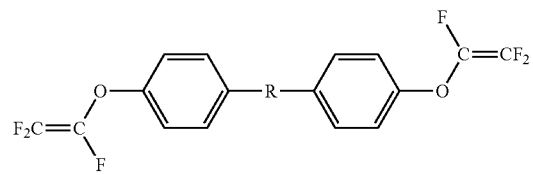

R represents SO$_2$, CH$_2$,

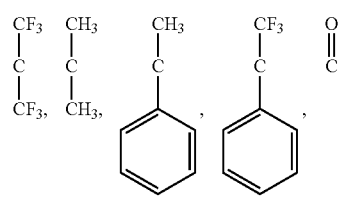

Formation of Network A by Reaction of Sulfonated Diamines with Epoxidized Monomers:

Network A may be constructed from sulfonated diamines using:

1—a first monomer with at least one aromatic ring and two amine functions (NH$_2$), and on at least one of the aromatic rings at least one cation-exchange group of imidazolium or carboxylic acid (COOY), phosphonic acid (PO$_3$Y) or, preferably, sulfonic acid (SO$_3$Y) type, where Y is chosen from H, Li, Na, K and HNR$_3$ where R represents an alkyl group comprising 1 to 5 carbon atoms, 2—a second monomer comprising two epoxide groups capable of reacting with the amine functions of the first monomer, 3—a third monomer containing three epoxide groups susceptible to react with the amine functions of the first monomer. This compound may be used to increase the degree of crosslinking of the network.

The synthesis may take place using only monomers 1 and or monomers 1 and 3. The choice is set so as to control the degree of crosslinking and the ion-exchange capacity of the membrane.

Examples of First Monomer:

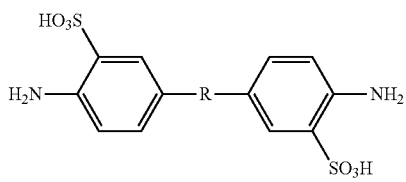

R represents $SO_2$, $CH_2$,

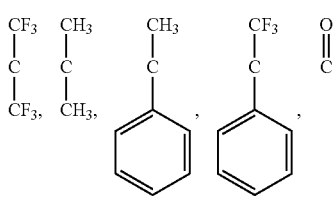

Examples of Second Monomer:

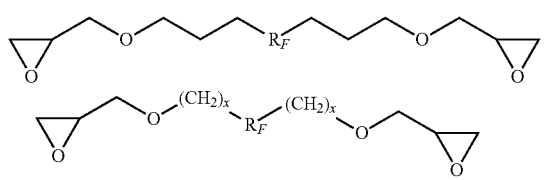

with x being an integer ranging from 1 to 11, $R_F$ chosen from: —$(CF_2)_4$—, —$(CF_2)_6$—, —$(CF_2)_4$—$CH_2$—$CH(CF_3)$—, —$CH(CF_3)CH$—$CH_2$—$(CF_2)_4$—$CH_2$—$CH(CF_3)$—, —$(CF_2)_4(-H_2C-CF_2-)_n(-CF_2-CF(CF_3)-)_m$- and n and m represent integers ranging from to 30 and advantageously from 0 to 15, and the monomer having a molar mass of less than or equal to 6000 g/mol.

Example of Third Monomer:

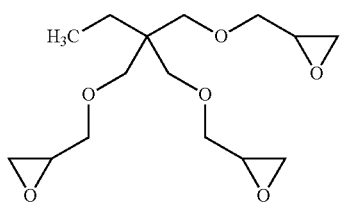 [SMILES: CCC(COCC1CO1)(COCC1CO1)COCC1CO1]

trimethylolpropane triglycidyl ether

Formation of network B: By way of example, combinations of monomers for constructing network B are described below:

Formation of Network B by Alcohol-Isocyanate Reaction

It is possible to prepare network B by alcohol-isocyanate reaction with:

1. a first monomer comprising groups $CF_n$ with n=1 to 3, comprising at least two alcohol functions (OH),
2. a second monomer comprising at least three isocyanate functions (NCO) for crosslinking,
3. optionally a third monomer with two isocyanate functions (NCO),
4. an optional catalyst for accelerating the reaction.

The presence of the third monomer in the synthesis is not essential. It is used to adjust the degree of crosslinking of the network. The first and second monomer with the catalyst may be used alone.

The alcohol-isocyanate addition is poorly controlled in the presence of acid groups in network A on account of the numerous side reactions. Thus, the proton of the acid groups of network A must be replaced with another counterion, for example $K^+$ or $Na^+$ during the formation of network B in the presence of network A.

Examples of First Monomer:

molecule of general formula $HO(CH_2)_x$—$R_F$—$(CH_2)_x$ OH, with x=1, 2 or 3, $R_F$ chosen from: —$(CF_2)_4$—, —$(CF_2)_6$—, —$(CF_2)_8$—, —$(CF_2)_4$—$CH_2$—$CH(CF_3)$ —, —$(CF_3)CH$—$CH_2$—$(CF_2)_4$—$CH_2$—$CH(CF_3)$—, —$(CF_2)_4(-H_2C-CF_2-)_n(-CF_2-CF(CF_3)-)_m$— and n and m represent integers ranging from 0 to 30 and advantageously from 0 to 15, and the monomer having a molar mass of less than or equal to 6000 g/mol.

2,2,3,3,4,4,5,5-octafluoro-1,6-hexanediol (commercially available molecule)

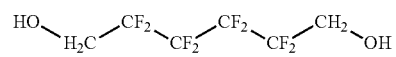

Examples of Second Monomers:

The crosslinking may be performed with a polyisocyanate.

isocyanurate based on hexamethylene diisocyanate (sold under the name Desmodur N3300®)

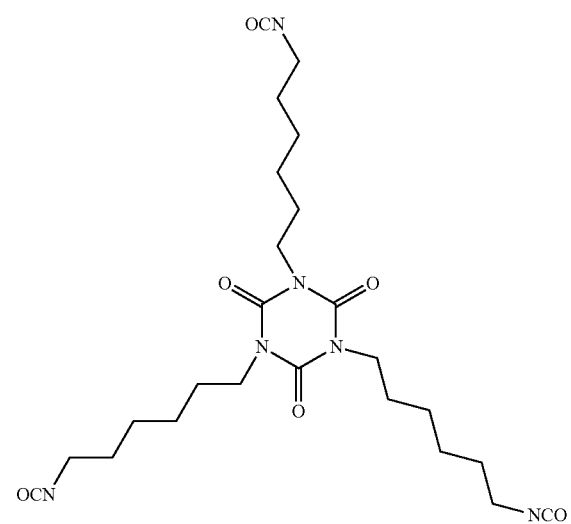

triisocyanate:

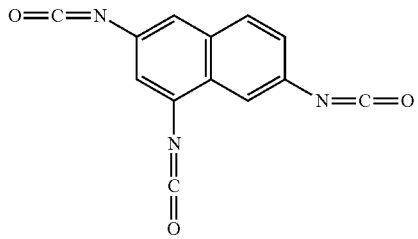 [SMILES: O=C=Nc1cc(N=C=O)c2cc(N=C=O)ccc2c1]

Examples of Third Monomers:
  molecule of general formula OCN(CH$_2$)$_3$R$_F$—(CH$_2$)$_3$NCO with R$_F$=—(CF$_2$)$_x$— and x=2,4,6,8, —(—H$_2$C—CF$_2$—)$_a$(—CF$_2$—CF(CF$_3$)—)$_b$— and (CF$_3$)CHCH$_2$—(CF$_2$)$_x$—[CH$_2$CH(CF$_3$)]$_b$ and x=2,4,6,8, a is an integer ranging from 1 to 5, b=0 or 1.
  toluene 2,4-diisocyanate (TDI)

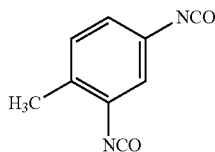

4,4'-methylenebis(phenyl isocyanate) (MDI)

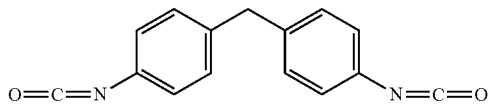 [SMILES: O=C=Nc1ccc(Cc2ccc(N=C=O)cc2)cc1]

isophorone diisocyanate

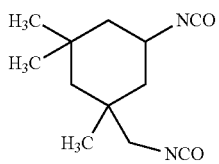

1,4-phenylene diisocyanate

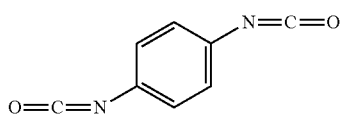

Examples of Catalysts:
  The alcohol-isocyanate reaction may be catalyzed with:
  a tin-based catalyst, such as dibutyltin dilaurate (DBTDL), and the reaction temperature is about 50° C.
  DABCO or 1,4-diazabicyclo[2.2.2]octane.

Formation of Network B by Radical Polymerization Starting with Monoacrylate
  It is possible to prepare network B by radical copolymerization of monoacrylates or monomethacrylates with:
  1/ a first monomer comprising groups CF$_n$ with n=1 to 3 and an acrylate function (OOC—CH═CH$_2$) or methacrylate function (OOC—C(CH$_3$)═CH$_2$).

2/ a second monomer with at least two acrylate or methacrylate bonds as crosslinking agent.
3/ a thermal or photochemical initiator
Examples of First Monomer:
  2,2,3,3,4,4,5,5,6,6,7,7-dodecafluoroheptyl acrylate

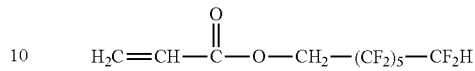

3,3,4,4,5,5,6,6,7,7,8,8,9,9,10,10,10-heptadecafluorodecyl acrylate

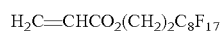

3,3,4,4,5,5,6,6,7,7,8,8,8-tridecafluorooctyl acrylate
3,3,4,4,5,5,6,6,6-nonafluoro-1-hexene

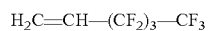

Examples of Second Monomer for the Crosslinking:
  poly(ethylene glycol) dimethacrylate

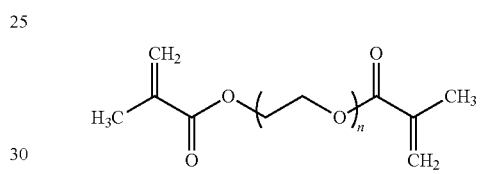

with n being an integer ranging from 1 to 140
Examples of Thermal Initiator:
  t-amyl peroxypivalate (55° C.)
  tert-butyl dicyclohexyl peroxydicarbonate (PCDH) (60° C.)
  t-butyl peroxypivalate (74° C.)
  azobisisobutyronitrile (AIBN) (80° C.)
  benzoyl peroxide (92° C.)
  2,5-bis(tert-butylperoxy)-2,5-dimethylhexane (134° C.)
  tBuO-OtBu (142° C.)

The temperature indicated in brackets is the working temperature corresponding to a half-life time of one hour.

Formation of Network B by Radical Polymerization Starting with Diacrylate
  It is possible to prepare network B by radical polymerization of diacrylate or dimethacrylate with:
  1/ a first monomer comprising groups CF$_n$ with n=1 to 3 with two acrylate functions (OOC—CH═CH$_2$) or methacrylate functions (OOC—C(CH$_3$)═CH$_2$).
  2/ a thermal or photochemical initiator
Examples of First Monomers:
  1H,1H,6H,6H-perfluoro-1,6-hexanediol acrylate

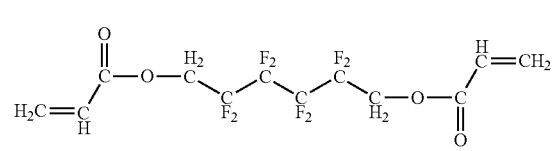

2,2,3,3,4,4,5,5-octafluorohexanediol 1,6-dimethacrylate

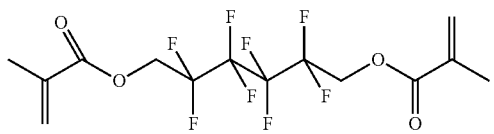 [SMILES: C=C(C)C(=O)OCC(F)(F)C(F)(F)C(F)(F)C(F)(F)COC(=O)C(=C)C]

molecule of general formula $H_2C=CHCO_2C_2H_4-R_F-C_2H_4CO_2CH=CH_2$ with $R_F=-(CF_2)_4-$, $-(CF_2)_6-$, $-(CF_2)_4-CH_2-CH(CF_3)-$, $-(CF_3)CH-CH_2-(CF_2)_4-CH_2-CH(CF_3)-$, $-(CF_2)_4(-H_2C-CF_2-)_n(-CF_2-CF(CF_3)-)_m-$ and n and m represent an integer ranging from 0 to 30 and advantageously from 0 to 15, the monomer having a molar mass of less than or equal to 6000 g/mol.

Examples of Thermal Initiator:

t-amyl peroxypivalate (55° C.)

dicyclohexyl tert-butylperoxydicarbonate (PCDH) (60° C.)

t-butyl peroxypivalate (74° C.)

azobisisobutyronitrile (AIBN) (80° C.)

benzoyl peroxide (92° C.)

2,5-bis(tert-butylperoxy)-2,5-dimethylhexane (134° C.)

tBuO-OtBu (142° C.)

Formation of Network B by Reaction of Epoxides with Amines:

Network B can be prepared from diepoxides with:

1/ a first monomer comprising groups $CF_n$ with n=1 to 3 with at least two epoxide functions.

2/ a second monomer comprising two amine groups ($NH_2$), which can react with the epoxide groups of the first monomer.

Examples of First Monomer:

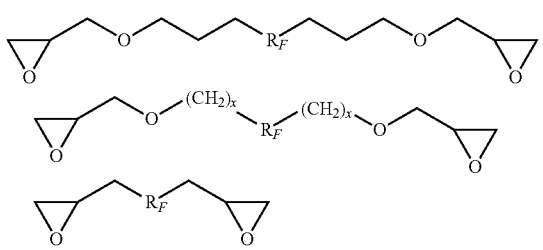

with x being an integer ranging from 1 to 11, $R_F$ chosen from $-(CF_2)_4-$, $-(CF_2)_6-$, $-(CF_2)_4-CH_2-CH(CF_3)-$, $-(CF_3)CH-CH_2-(CF_2)_4-CH_2-CH(CF_3)-$, $-(CF_2)_4(-H_2C-CF_2-)_n(-CF_2-CF(CF_3)-)_m-$ and n and m represent an integer ranging from 0 to 30 and advantageously from 0 to 15, the monomer having a molar mass of less than or equal to 6000 g/mol.

Examples of Second Monomer:

molecule of general formula $H_2N-(CH_2)_x-R_F-(CH_2)_x-NH_2$ with x=2 or 3 and, in each case: $R_F=(CF_2)_z$ with z=4, 6 or 8; or $(CF(CF_3)CF_2)_a-(CH_2CF_2)_b$ with a and b being integers ranging from 0 to 10; or $(CF_2)_z(CH_2CH(CF_3))_c$ with c being an integer ranging from 0 to 10 and z=4, 6 or 8; or $CH(CF_3)CH_2-(CF_2)_zCH_2CH(CF_3)$ z=4, 6 or 8.

2,2-bis(3-amino-4-hydroxyphenyl)hexafluoropropane

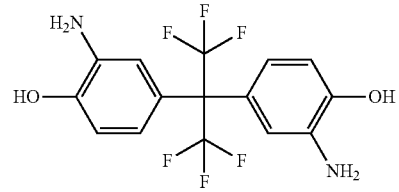 [SMILES: Nc1cc(C(c2ccc(O)c(N)c2)(C(F)(F)F)C(F)(F)F)ccc1O]

2,2-bis(3-amino-4-methylphenyl)hexafluoropropane

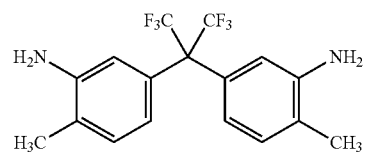 [SMILES: Cc1ccc(C(c2ccc(C)c(N)c2)(C(F)(F)F)C(F)(F)F)cc1N]

2,2-bis(4-aminophenyl)hexafluoropropane

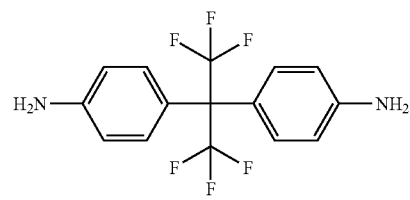 [SMILES: Nc1ccc(C(c2ccc(N)cc2)(C(F)(F)F)C(F)(F)F)cc1]

2,2-bis(3-aminophenyl)hexafluoropropane

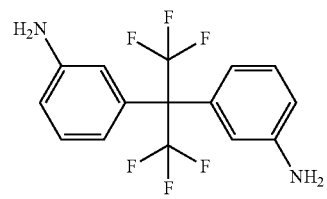 [SMILES: Nc1cccc(C(c2cccc(N)c2)(C(F)(F)F)C(F)(F)F)c1]

4-fluoro-1,2-phenylenediamine

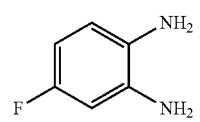

2,2-bis(4-(4-aminophenoxy)phenyl)hexafluoropropane

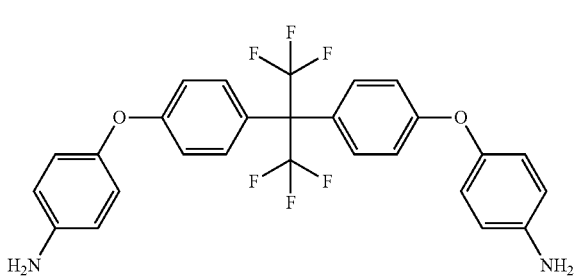 [SMILES: Nc1ccc(Oc2ccc(C(c3ccc(Oc4ccc(N)cc4)cc3)(C(F)(F)F)C(F)(F)F)cc2)cc1]

4,4'-bis[2-(p-aminophenyl)hexafluoroisopropyl]diphenyl ether

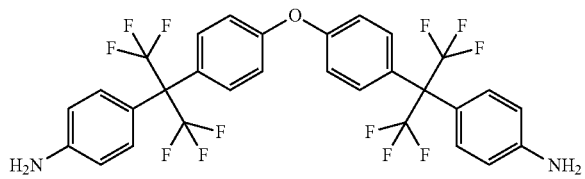 [SMILES: Nc1ccc(C(c2ccc(Oc3ccc(C(c4ccc(N)cc4)(C(F)(F)F)C(F)(F)F)cc3)cc2)(C(F)(F)F)C(F)(F)F)cc1]

A subject of the invention is also a film obtained from interpenetrating polymer networks as described above via the process that has also been described and that is detailed in the experimental section.

The films of the invention may be produced by depositing a precursor mixture of IPN as described above onto a mold, for instance a plate, followed by polymerization. In the case where it is desired to make a fuel cell membrane, a deposition is envisaged such that the thickness of the membrane is between 5 and 200 μm and advantageously between 10 and 25 μm.

Advantageously, the films obtained from the interpenetrating polymer networks that have been described above may be used for the manufacture of fuel cell membranes. Such a film is mechanically stable in dry or hydrated form, it is a good proton conductor, it is permeable to water while at the same time being sparingly permeable to methanol, hydrogen and oxygen, and it is electronically insulating.

The film obtained, supported or unsupported, acidified or non-acidified, may be used directly in any application requiring a cation-exchange membrane, i.e. for PEMFC or DMFC fuel cells, electrolysers, sensors, supercapacitors, batteries, electrochromic devices, etc.

However, other applications of these films may be envisaged: other electrochemical systems, such as lithium ion-conducting solid electrolytic polymers, and also selective membranes for chemical analysis processes.

The membranes obtained via the process of the invention have:
- an ion-exchange capacity of greater than or equal to 1 mmol/g,
- hydrogen and oxygen permeabilities, respectively, of less than 5 bar,
- improved mechanical strength: greater than 100 MPa at room temperature and in dry form.

This mechanical strength is evaluated by measurement via dynamic mechanical analysis of the storage modulus of the membranes.
- a proton conductivity of greater than or equal to $10^{-2}$ S/cm² at room temperature, immersed in water. This measurement is performed under the conditions described in Y. Sone et al., J. Electrochem. Soc., 143, No. 4, 1996, 1254-1259.
- improved chemical stability toward hydrolysis and radical attack when compared with the sulfonated hydrocarbon-based polymers of the prior art. This chemical stability is evaluated by measuring the loss of mass after 7 days in Fenton's reagent at 70° C., i.e. a 30% by mass hydrogen peroxide solution with an iron sulfate concentration of $10^{-2}$ mol/l. No loss of mass is observed under these conditions.

The membranes of the invention are thus more mechanically and chemically stable than the membranes of the prior art, while at the same time having at least equivalent proton conductivity, irrespective of the conditions, and much lower permeability to gases.

EXPERIMENTAL SECTION

I—Fluorovinyl Ether Precursors

Various membranes were prepared in the experimental section from two fluorovinyl ether precursors for network A and by varying network B.

The precursor known as sulfonated difluorovinyl ether has the following chemical structure:

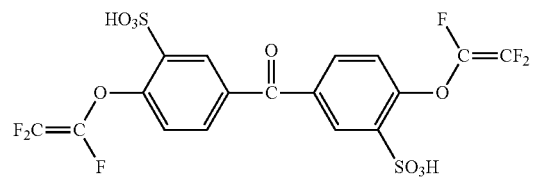

The same procedures may be applied to the other difluorovinyl ether precursors described above. It suffices to modify the amounts of monomer so as to have the desired ion exchange capacity.

The precursor referred to in the following examples as trifluorovinyl ether has the following chemical structure:

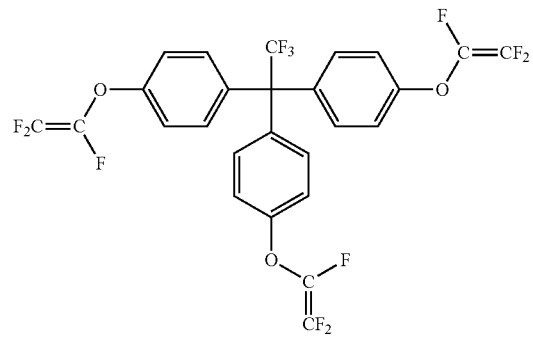

The same procedures may be applied to the other trifluorovinyl ether precursors described above. It suffices to modify the amounts of monomer so as to have the desired ion-exchange capacity.

In all these syntheses, the sulfone precursors are neutralized, i.e. they are not in acid form. Thus, the group $SO_3^-$ is associated with a counterion, for example $Na^+$.

Example 1

Monoacrylate Precursor for the Fluorinated Network B 50 mg of 2,2'-azobisisobutyronitrile (5% by mass relative to the monomer) are dissolved in 0.9 g of 3,3,4,4,5,5,6,6,7,7,8,8,8-tridecafluorooctyl acrylate and 0.1 g of polyethylene glycol) dimethacrylate (Mn=330 g·mol⁻¹). A solution containing $1 \times 10^{-3}$ mol (0.53 g) of sulfonated difluorovinyl ether, $7 \times 10^{-4}$ mol (0.42 g) of trifluorovinyl ether and 2.5 ml of dimethylacetamide is prepared. The two solutions are then mixed together and the mixture is stirred under an argon atmosphere at room temperature for 30 minutes. The solution obtained is then deposited by coating using a knife 100 μm thick onto a glass plate. The assembly is heat-treated for 15 hours at 60° C. and then for 6 hours at 150° C. in order to successively initiate the polymerization reactions, and then at 150° C. under a primary vacuum for 2 hours in order to remove the solvents. The assembly is then immersed in 2 L of ultrapure water at room temperature for 24 hours so as to detach the membrane from the glass support and to remove the solvent residues. The membrane is then exchanged by immersing it in 1.5 L of 1M $H_2SO_4$ at 80° C. for 1 hour. Finally, the membrane is rinsed in ultrapure water at 80° C. for 1 hour after a first passage through ultrapure water at room temperature so as to remove the acid residues.

Example 2

Diacrylate Precursor for the Fluorinated Network B 50 mg of 2,2'-azobisisobutyronitrile (5% by mass relative to the monomer) are dissolved in 1 g of 2,2,3,3,4,4,5,5,6,6,7,7-dodecafluoro-1,8-octanediol diacrylate. A solution containing $1 \times 10^{-3}$ mol of sulfonated difluorovinyl ether (0.53 g), $7 \times 10^{-4}$ mol of trifluorovinyl ether (0.42 g) and 2.5 ml of dimethylacetamide is prepared. The two solutions are then mixed together and the mixture is stirred under an argon atmosphere at room temperature for 30 minutes. The solution obtained is then deposited by coating using a knife 100 μm thick onto a glass plate. The assembly is heat-treated for 15 hours at 60° C. and then for 6 hours at 150° C. in order to successively initiate the polymerization reactions, and then at 150° C. under a primary vacuum for 2 hours in order to remove the solvents. The assembly is then immersed in 2 L of ultrapure water at room temperature for 24 hours to detach the membrane from the glass support and to remove the solvent residues. The membrane is then exchanged by immersing it in 1.5 L of 1M $H_2SO_4$ at 80° C. for 1 hour. Finally, the membrane is rinsed in ultrapure water at 80° C. for 1 hour after a first passage through ultrapure water at room temperature so as to remove the acid residues.

Example 3

Diepoxide Precursor for the Fluorinated Network B 1.07 g of 2,2,3,3,4,4,5,5,6,6,7,7-dodecafluoro-1,8-octanediol diglycidyl ether and 0.13 g of 2,2',2''-triaminotriethylamine are dissolved in 0.5 ml of dimethylacetamide. A solution containing $1.8 \times 10^{-3}$ mol of sulfonated difluorovinyl ether, $3.96 \times 10^{-4}$ mol of trifluorovinyl ether and 2 ml of dimethylacetamide is prepared. The two solutions are then mixed together and the mixture is stirred under an argon atmosphere at room temperature for 30 minutes. The solution obtained is then deposited by coating using a knife 100 μm thick onto a glass plate. The assembly is heat-treated for 15 hours at 90° C. and then for 6 hours at 150° C. in order to successively initiate the polymerization reactions, and then at 150° C. under a primary vacuum for 2 hours in order to remove the solvents. The assembly is then immersed in 2 L of ultrapure water at room temperature for 24 hours to detach the membrane from the glass support and to remove the solvent residues. The membrane is then exchanged by immersing it in 1.5 L of 1M $H_2SO_4$ at 80° C. for 1 hour. Finally, the membrane is rinsed in ultrapure water at 80° C. for 1 hour after a first passage through ultrapure water at room temperature so as to remove the acid residues.

II—Sulfonated Diamine Precursor

Various membranes were prepared in the experimental section starting with two sulfonated amine precursors for network A and by varying network B.

The precursor referred to as sulfonated diamine hereinbelow has the following chemical structure:

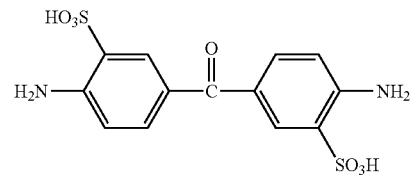 [SMILES: Nc1ccc(C(=O)c2ccc(N)c(S(=O)(=O)O)c2)cc1S(=O)(=O)O]

This is an example, given that it is possible to use, in same way, all the first sulfonated diamine monomers described above. It suffices to modify the amounts of monomers so as to have the desired ion-exchange capacity.

The precursor referred to as fluorinated diepoxide hereinbelow has the following chemical structure:

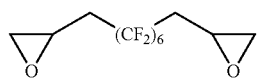

This is an example, given that it is possible to use, in the same way, all the diepoxide monomers described above. It suffices to modify the amounts so as to have the desired ion-exchange capacity.

In all these syntheses, the sulfonated precursors are neutralized, i.e. they are not in acid form. Thus, the group $SO_3^-$ is associated with a counterion, for example $Na^+$.

Example 4

Monoacrylate Precursor for the Fluorinated Network B 50 mg of 2,2'-azobisisobutyronitrile (5% by mass relative to the monomer) are dissolved with stirring in 0.9 g of 3,3,4,4,5,5,6,6,7,7,8,8,8-tridecafluorooctyl acrylate, 0.1 g of poly(ethylene glycol) dimethacrylate ($Mn \approx 330$ g·mol$^{-1}$). A solution of $1.5 \times 10^{-3}$ mol of sulfonated diamine and $9 \times 10^{-4}$ mol of trimethylolpropane triglycidyl ether and 2.5 ml of dimethylacetamide is prepared. The two solutions are then mixed together and the mixture is stirred under an argon atmosphere at room temperature for 30 minutes. The solution obtained is then deposited by coating using a knife 100 μm thick onto a glass plate. The assembly is heat-treated for 15 hours at 60° C. and then for 6 hours at 150° C. in order to successively initiate the polymerization reactions, and then at 120° C. under a primary vacuum for 2 hours in order to remove the solvents. The assembly is then immersed in 2 L of ultrapure water at room temperature for 24 hours to detach the membrane from the glass support and to remove the solvent residues. The membrane is then exchanged by immersing it in 1.5 L of 1M $H_2SO_4$ at 80° C. for 1 hour. Finally, the membrane is rinsed in ultrapure water at 80° C. for 1 hour after a first passage through ultrapure water at room temperature so as to remove the acid residues.

Example 5

Diacrylate Precursor for the Fluorinated Network B 50 mg of 2,2'-azobisisobutyronitrile (5% by mass relative to the monomer) are dissolved with stirring in 1 g of 2,2,3,3,4,4,5,5,6,6,7,7-dodecafluoro-1,8-octanediol diacrylate. A solution of $1.5\times10^{-3}$ mol of sulfonated diamine and $9\times10^{-4}$ mol of trimethylolpropane triglycidyl ether and 2.5 ml of dimethylacetamide is prepared. The two solutions are then mixed together and the mixture is stirred under an argon atmosphere at room temperature for 30 minutes. The solution obtained is then deposited by coating using a knife 100 μm thick onto a glass plate. The assembly is heat-treated for 15 hours at 60° C. and then for 6 hours at 120° C. in order to successively initiate the polymerization reactions, and then at 120° C. under a primary vacuum for 2 hours in order to remove the solvents. The assembly is then immersed in 2 L of ultrapure water for 24 hours to detach the membrane from the glass support and to remove the solvent residues. The membrane is then exchanged by immersing it in 1.5 L of 1M $H_2SO_4$ at 80° C. for 1 hour. Finally, the membrane is rinsed in ultrapure water at 80° C. for 1 hour after a first passage through ultrapure water at room temperature so as to remove the acid residues.

In each of the examples, membranes with a thickness of about 50 μm are obtained. These membranes are flexible and transparent.

The membranes obtained are more mechanically and chemically stable than the membranes of the prior art, while at the same time having at least equivalent proton conductivity irrespective of the working conditions, and much lower permeability to gases.

The invention claimed is:

1. An interpenetrating polymer network, comprising:
   i) a first network of crosslinked cationic-conducting polymer referred to as A formed from monomers, at least one of which contains at least one aromatic group functionalized with at least one cation-exchange group, and results from the copolymerization of at least:
      a first monomer with at least one aromatic ring and two polymerizable functions PF1 and on at least one of the aromatic rings at least one cation-exchange group chosen from: an imidazolium, a carboxylic acid (COOY), a phosphonic acid ($PO_3Y$) and a sulfonic acid ($SO_3Y$), where Y is chosen from H, Li, Na, K and $HNR_3$ where R represents an alkyl group comprising 1 to 5 carbon atoms,
      a second monomer comprising at least two polymerizable functions PF2 susceptible to react with the functions PF1 of the first monomer to form a covalent bond, and
   ii) a second network of crosslinked fluorocarbon polymer referred to as B formed from monomers, at least one of which contains at least one fluorinated group ($R_F$), and results from the copolymerization of at least:
      a first monomer comprising groups $CF_n$ with n=1 to 3 comprising at least two polymerizable functions PF3,
      a second monomer comprising at least two polymerizable functions PF4 susceptible to react with the functions PF3 of the first monomer to form a covalent bond, wherein the distance between the networks of polymers A and B does not exceed 40 nm, and the networks of polymers A and B are not covalently bonded to each other.

2. The interpenetrating polymer network as claimed in claim 1, in which network A results from one of the following polymerization methods:
   dimerization of fluorovinyl ether functions,
   reaction of sulfonated diamines with epoxidized monomers.

3. The interpenetrating polymer network as claimed in claim 1, in which network A has a content of crosslinking agent of between 25% and 50% and an ion-exchange capacity of greater than 0.5 mmol/g.

4. The interpenetrating polymer network as claimed in claim 1, in which network B results from one of the following polymerization methods:
   alcohol-isocyanate reaction,
   radical polymerization of monoacrylates or monomethacrylates,
   radical polymerization starting from diacrylates or dimethacrylates,
   reactions of epoxides with amines.

5. The interpenetrating polymer network as claimed in claim 1, in which network B has a content of crosslinking agent of between 0.1% and 100%.

6. The interpenetrating polymer network as claimed in claim 1, in which the weight proportion of network A is between 50% and 80% relative to the two networks A and B as a whole.

7. A process for manufacturing an interpenetrating polymer network as claimed in claim 1, this process comprising:
   (i) at least one step during which the precursor monomers of network A and the precursor monomers of network B are mixed together,
   (ii) at least one step during which the polymerization of A and the polymerization of B are initiated.

8. The process as claimed in claim 7, which also includes, between steps (i) and (ii), deposition of the mixture in a mold.

9. A film obtained from an interpenetrating polymer network via a process as claimed in claim 7.

10. A fuel cell membrane comprising a film as claimed in claim 9.

11. The membrane as claimed in claim 10, which has the following properties:
    an ion-exchange capacity of greater than or equal to 1 mmol/g,
    permeabilities to hydrogen and oxygen, respectively, of less than 5 bar,
    mechanical strength evaluated by the measurement by dynamic mechanical analysis of the storage modulus of the membranes of greater than 100 MPa in the dry form and at room temperature,
    a proton conductivity of greater than or equal to $10^{-2}$ S/cm$^2$ at room temperature and immersed in water,
    a chemical stability evaluated by measuring the loss of mass after 7 days in Fenton's reagent at 70° C., i.e. a 30% by mass hydrogen peroxide solution with an iron sulfate concentration of $10^{-2}$ mol/l, this loss of mass being zero.

12. The interpenetrating polymer network as claimed in claim 1, in which network A results from the copolymerization of at least two monomers, one of which comprises at least one aromatic group and at least one cation-exchange group selected from the group consisting of a carboxylic acid (COOH), a phosphonic acid ($PO_3H$) and a sulfonic acid ($SO_3H$).

13. The interpenetrating polymer network as claimed in claim 1, in which network A has a content of crosslinking agent of between 25% and 50% and an ion-exchange capacity of greater than 1 mmol/g.

14. The interpenetrating polymer network as claimed in claim 1, wherein the distance between the networks of polymers A and B does not exceed 10 nm.

* * * * *